United States Patent

Frimml et al.

[11] Patent Number: 5,426,928
[45] Date of Patent: Jun. 27, 1995

[54] ROUND BALER PICKUP HAVING RADIALLY FIXED TEETH COOPERATING WITH STRIPPER PLATES TO DIRECT CROP UPWARDLY INTO BALE CHAMBER

[75] Inventors: Roger W. Frimml, Ottumwa; George W. Rumph, Bloomfield, both of Iowa

[73] Assignee: Deere & Company, Moline, Ill.

[21] Appl. No.: 150,629

[22] Filed: Nov. 9, 1993

[51] Int. Cl.⁶ ............................................. A01D 39/00
[52] U.S. Cl. ........................................ 56/341; 56/364
[58] Field of Search .................. 56/341, 364; 100/88

[56] References Cited

U.S. PATENT DOCUMENTS 3,397,527 8/1968 Luek et al. ............................ 56/364

Primary Examiner—Ramon S. Britts
Assistant Examiner—Pamela A. O'Connor

[57] ABSTRACT

A large round baler is equipped with a pickup having a reel provided with fixed tooth bars to which are mounted a plurality of teeth having tines projecting approximately radially outwardly from the axis of rotation of the reel. The fixed tines cooperate with the upper surface of a stripper assembly to convey crop directly into the inlet of a baling chamber and against an upwardly moving surface of a run of belts defining a rear wall of the chamber.

8 Claims, 3 Drawing Sheets

ROUND BALER PICKUP HAVING RADIALLY FIXED TEETH COOPERATING WITH STRIPPER PLATES TO DIRECT CROP UPWARDLY INTO BALE CHAMBER

BACKGROUND OF THE INVENTION

The present invention relates to large round balers and more specifically relates to pickups for introducing crop into the inlet of the bale-forming chamber of such balers.

Large round balers are typically provided with pickups including a reel defined by a central shaft mounted for rotation about a horizontal transverse axis and carrying transversely spaced spider members to which a plurality of tooth bars are mounted for pivoting about respective axes paralleling said transverse axis. A plurality of spring teeth are mounted to each tooth bar and cam arms are connected to one end of each tooth bar and carry a roller received in a cam track mounted at one end of the pickup, the track being shaped for causing the tooth bars to rock and cause the teeth to trace out a desired path as they sweep crop into the baling chamber inlet. For example, in one known baler design having an expansible baling chamber with an inlet at the bottom thereof, the pickup teeth are guided such that they withdraw from the crop and through slots between bands forming a crop stripper at a point just before the crop engages an upwardly traveling run of belts forming a rear portion of the baling chamber. Further, the guided motion of the teeth keep them from interfering with the upright run of belts at a location where they are supported by a lower front roll carried by the discharge gate of the baler.

While pickups incorporating cam-guided teeth, as in the aforementioned example, operate satisfactory, the cam track, roller arms and rollers for effecting tooth guidance adds a considerable amount to the cost of manufacturing the pickup.

SUMMARY OF THE INVENTION

According to the present invention there is provided an improved pickup. More specifically, there is provided a pickup which utilizes teeth mounted for disposing tines thereof in a fixed radial or near radial disposition during operation and to provide a stripper structure for lifting crop off the teeth in the vicinity of an upwardly traveling run of the bale chamber forming belts.

A broad object of the invention is to provide a large round baler with a pickup equipped with teeth having tines which operate in a fixed, nearly radial disposition, the pickup being no less effective in delivering crop to the inlet of the baling chamber and in aiding the start of a bale than is a pickup having teeth whose disposition is controlled by a cam during operation.

A more specific object of the invention is to provide a pickup as set forth in the previous object which includes a stripper structure having an upper planar surface inclined so that crop guided along the surface will be directed against an upwardly traveling run of the bale chamber forming belts at a location above a support roll located at a lower front location of the discharge gate of the baler.

These and other objects will become apparent from a reading of the ensuing description together with the appended drawings.

DESCRIPTION OF THE PREFERRED EMBODIMENT

Initially, it is to be noted that various components are described as existing in pairs while only one of each pair is shown and it is to be understood that the unshown component is the same or similar in construction to the one shown.

Figure 1:
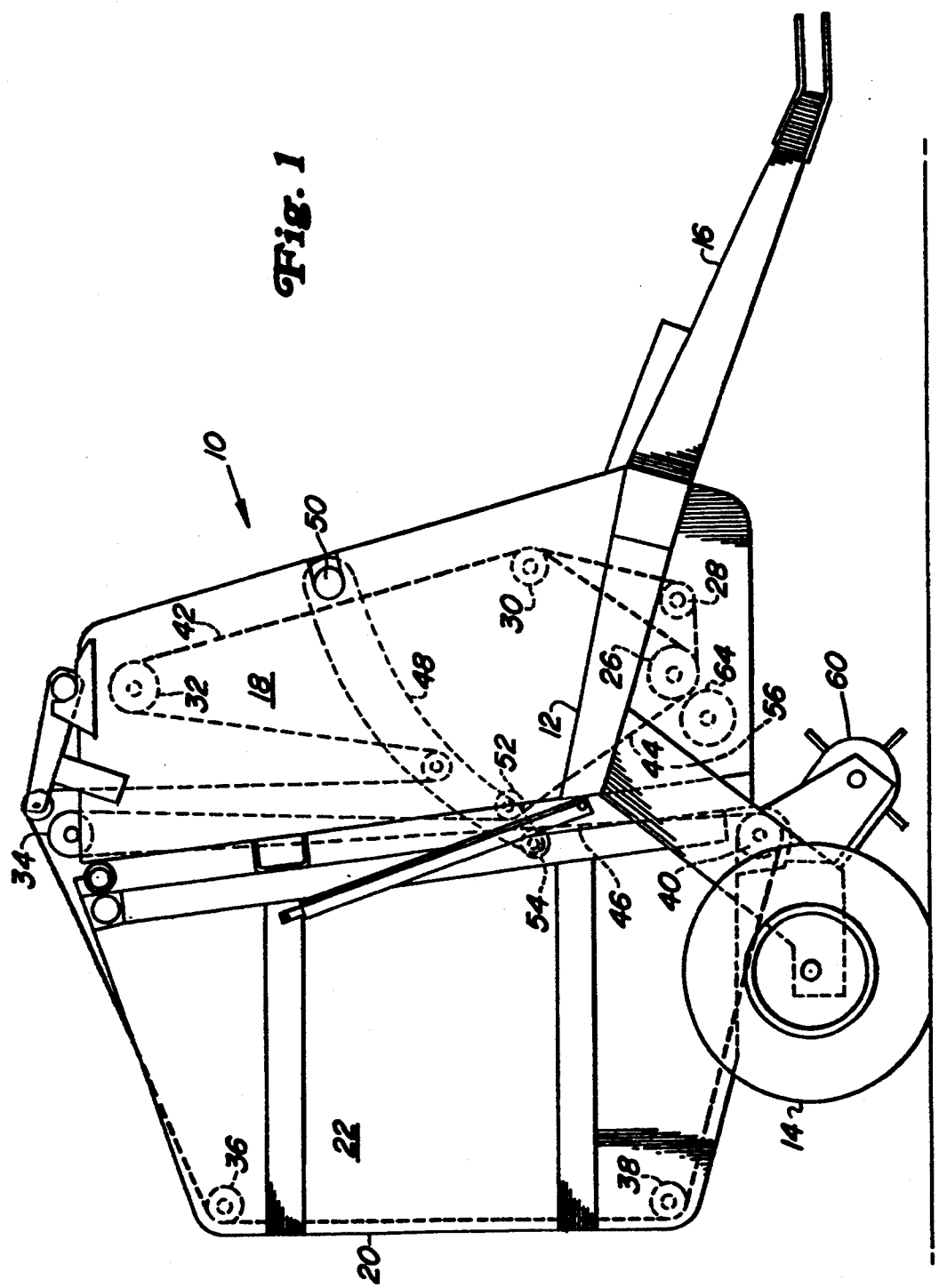
FIG. 1 is a right side elevational view of a large round baler having a pickup of the type with which the present invention is particularly adapted for use.

Referring now to FIG. 1, there is shown a baler 10 of the type for making large cylindrical bales and commonly called a large round baler. The baler 10 comprises a main frame 12 supported on a pair of ground wheels 14 and having a draft tongue 16 secured thereto and adapted for being connected to a tractor. A pair of transversely spaced vertical sidewalls 18 are joined to the frame 12 and has respective upright rear ends. A bale discharge gate 20 including opposite side walls 22 is vertically pivotally attached, as at 24, to upper rear locations of the sidewalls 18, the sidewalls 22 having forward ends which abut against the rearward ends of the sidewalls 18 when the gate 20 is in a lowered closed position as shown.

The pairs of sidewalls 18 and 22 rotatably support the opposite ends of a plurality of bale-forming belt support rolls adjacent the periphery of the sidewalls. Specifically, beginning at a lower central location of the sidewalls 18 and proceeding counterclockwise, there is mounted a driven roll 26, a lower front roll 28, an intermediate front roll 30, an upper front roll 32, and an upper rear roll 34; and continuing counterclockwise from an upper rear location of the gate sidewalls 22 there is mounted an upper rear roll 36, a lower rear roll 38 and a lower front roll 40. A plurality of endless bale-forming belts 42 are spaced one from the other across the space between the opposite pairs of sidewalls 18 and 22. Except for some of the belts 42 which skip the lower front roll 28, the belts are trained so that they serially engage the rolls 26, 28, 30, 32, 36, 38, 40 and 34. A front run 44 of the belts 42 extends upwardly from driven roll 26 to the roll 34. Similarly, a rear run 46 of the belts 42 extends upwardly from the lower front gate roll 40 to the roll 34. Mounted between rear end locations of a pair of rearwardly extending tensioning arms 48 which are vertically pivotally mounted, as at 50, to a mid-height location at the front of the sidewalls 18 are closely spaced, front and rear idler rolls 52 and 54. The front and rear runs 44 and 46 of the belts 42 respectively converge upwardly from the drive roll 26 and lower front gate roll 40 and pass closely to each other between the rolls 52 and 54, with the run 44 contacting a rear surface of the front roll 52 and with the run 46 contacting a forward surface of the rear roll 54. The runs 44 and 46 thus cooperate with the sidewalls 18 and 22 to define a baling chamber 56 which is closed at its top by the idler rolls 52 and 54 and, as viewed in vertical cross section from the side, is wedge-shaped. The bottom of the chamber 56 is provided with an inlet 58 (see also FIGS. 2 and 3) extending between the driven roll 26 and the lower front gate roll 40. Crop products are introduced into the inlet 58 by a pickup 60 for being rolled into a bale 62 (shown only in FIGS. 2 and 3) by the action of the front and rear runs 44 and 46 of the belts 42, which are respectively driven so as to travel toward and away from the inlet, and initially also by a starter roll 64 rotatably mounted in the sidewalls 18 adjacent to and being driven in the same direction as the driven roll 26. As the bale 62 is being formed, the chamber 56 yieldably expands against the force established in the belts by a tensioning system including the pair of tensioning arms 48 together with springs and hydraulic cylinders (not shown) coupled between the walls 18 and the arms 48 for resisting upward movement of the arms. Once the bale 62 reaches a certain size, the weight thereof is borne mainly by the lower front gate roll 40 but also by the driven roll 26 and the starter roll 64.

To this point, what has been described is well known in the art.

Figure 2:
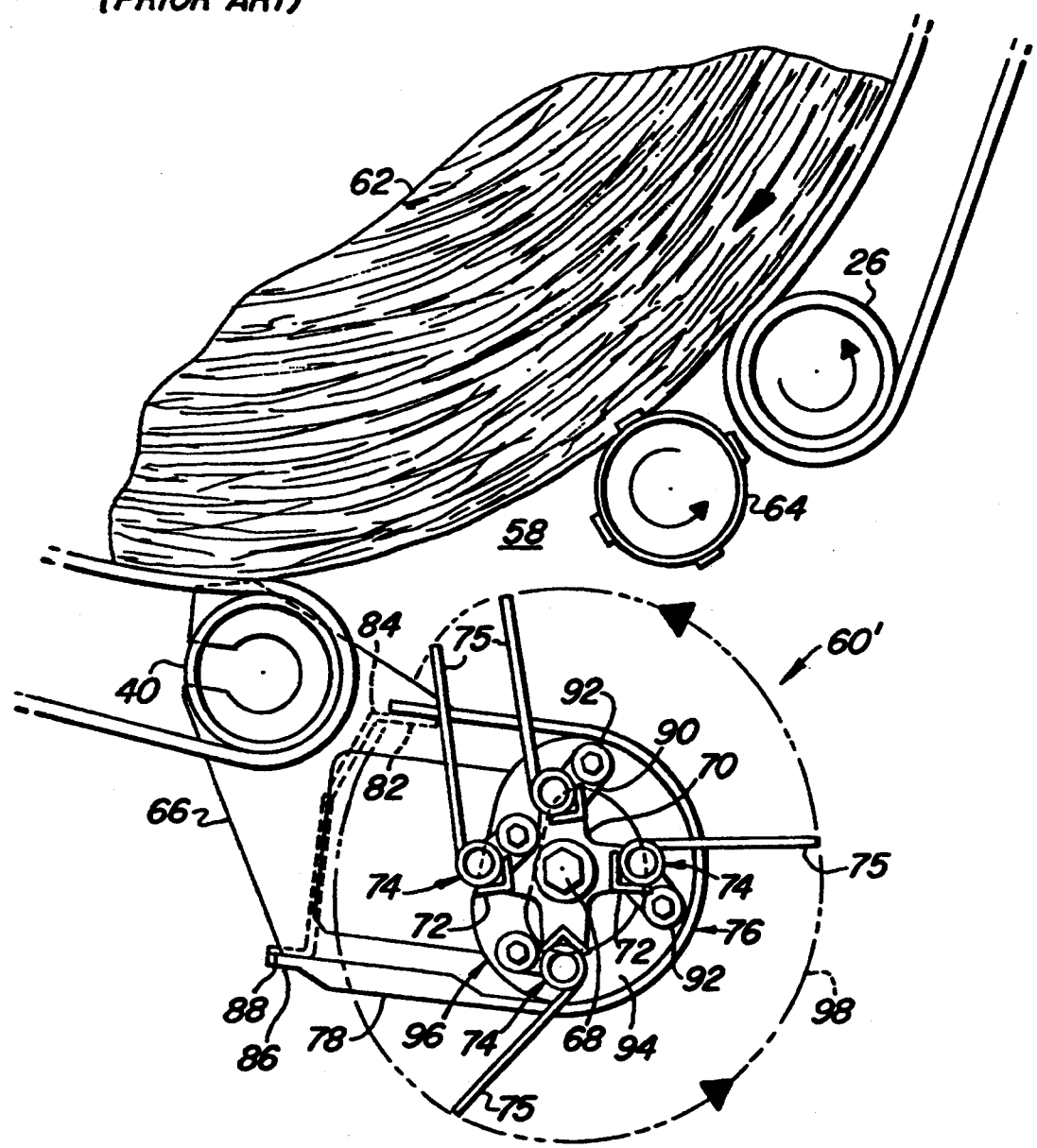
FIG. 2 is a vertical sectional view showing a prior art pickup construction.
Figure 3:
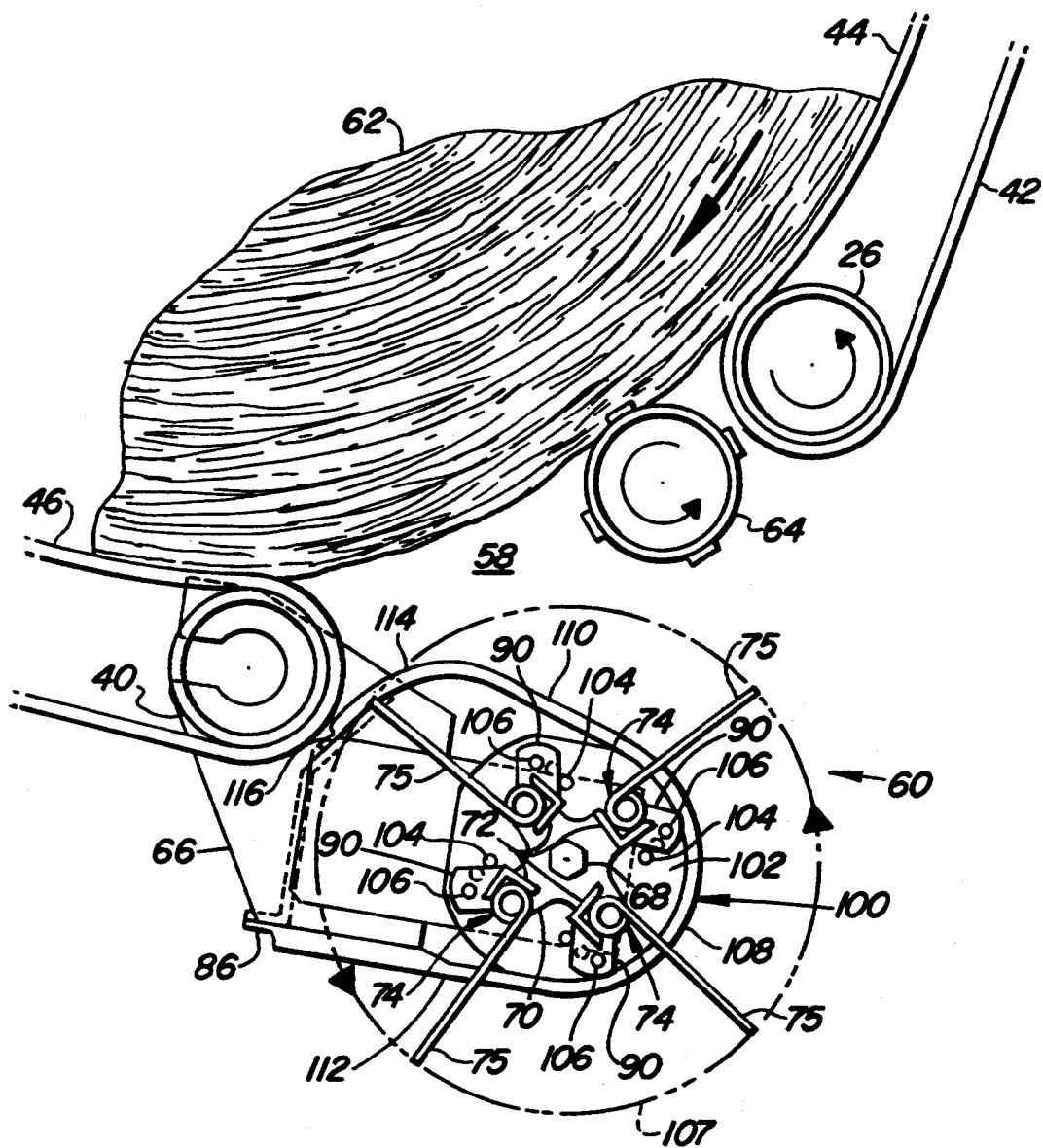
FIG. 3 is a view like FIG. 2 but showing the pickup of the present invention.

Referring now to FIG. 2 (common parts appearing in FIG. 3 are designated with the same reference numerals), there is shown details of a pickup which is also well known in the art. Specifically, there is shown a pickup 60' having a frame 66 pivotally mounted to the baler frame 12 for being adjusted about an axis, which in this case is coincident with the axis of rotation of the lower front gate roll 40. The pickup frame 66 is shown in the upper range of its adjustment. The pickup 60' includes a central drive shaft 68 of hexagonal cross section on which a pair of spiders 70 are fixedly mounted at transversely spaced locations. The spiders 70 each have four equi-angularly spaced arms and tooth bars 72, formed of angle iron, extend between timed arms of the pair of spiders and are pivotally mounted thereto by cylindrical pins (not shown) that are releasably bolted to the opposite ends of each tooth bar and pivotally received in bores provided in each pair of timed arms. Secured to each tooth bar 72 at transversely spaced locations therealong are spring teeth 74, each including a coiled inner part bolted to the angle iron and a pair of tines 75 extending outwardly from opposite ends of the inner part, as is conventional. The four teeth mounted to a similar location respectively of the four tooth bars 72, have first and second sets of coplanar tines 75. A U-shaped stripper assembly 76 opens rearwardly and comprises separate strippers 78 in the form of bands located between each set of coplanar tines 75 so that slots are formed between adjacent strippers for permitting free travel of the tines therethrough. As viewed from the side, each stripper 78 has a forward semi-circular nose portion joined to upper and lower parallel legs, with a rear end of the upper leg being bolted, as at 82, to an upper, flat transverse surface 84 of the pickup frame 66, and with the lower leg being bolted, as at 86, to a lower, flat transverse surface 88 of the frame 66. Provided for effecting controlled rocking motion of the tooth bars 72 and hence desired motion of the tines 75 as the tooth bars 72 revolve with the shaft 68 and spiders 70 is a cam assembly including arms 90 respectively welded to the outer ends of the pins respectively secured to the right ends of the four tooth bars 72. Mounted to each of the arms 90 is a cam roller 92 received in an endless, inwardly opening, substantially D-shaped track 94 of a cam 96 that is bolted to a left, upright side of the pickup frame 66. As the rollers 92 travel along the track 94, they cause the tooth bars 72 to be rocked so as to cause the outer ends of the tines 75 of the teeth 74 to trace a path indicated at 98. It can be seen that as the teeth 74 reach the top or twelve o'clock position of their travel counter clockwise rocking of the tines 75 is retarded so that a major component of the movement of the tines is downward as the tines are withdrawn below the plane of the upper legs of the strippers 78. Thus, the rearward force delivered by the tines to the mat of crop being moved rearwardly along the top of the strippers 78 diminishes greatly as the tines 75 approach the rear extent of their travel. Further, it can be seen that, when a bale 62 is first being started, the disposition of the planar surface of the upper leg of the strippers 78 guide the crop into the upright run of belts 46 at nearly a right angle thereto at an area supported by the lower front gate roll 40. Thus, in the initial stages of bale formation, very little impetus of the crop is directed upwardly to aid the upward flow of the crop as it is carried away by the belt run 46 and any impetus of the crop tending to bulge the belt run 46 rearwardly and thus help in the formation of a bale is thwarted by the support offered by the roll 40. Also, it can be seen that once the bale 62 mounted begins to be supported on the rolls 26, 40 and 64, the guided tines 75 have a limited ability to stuff the crop in the nip existing between the lower rear gate roll 40 and the bale 62 and also that the area for receiving crop to be stuffed is somewhat limited due to the presence of the tilting tines 75 and due to the fact that the rear ends of the upper legs of the strippers 78 terminate closely adjacent the belts 42 where they are supported by the roll 40.

Referring now to FIG. 3, there is shown the pickup 60 in sufficient detail to disclose the present invention. As mentioned above, those elements of the pickup 60 which are common to the pickup 60' as described above, are given the same reference numerals. The main differences the pickup 60 has over the pickup 60' is that the pickup 60 does not use a cam assembly for rocking the tooth bars 72 and the pickup utilizes strippers 100 which are shaped differently than the strippers 78. Specifically, instead of a cam 96 the pickup 60 includes an upright adjustment plate 102 fixed to the left end of the drive axle 68 and including four sets of three adjustment holes 104 with each set of three holes being arranged along a radius of a respective bore of one of the four arms of the adjacent spider 70. The arms 90 no longer have cam rollers mounted thereto but instead have latch pins 106 which are received in the arms 90 and in a selected one of the sets of holes 104. As shown, the hole selected fixes the tooth bars 72 so as to dispose the tines 75 substantially radially relative to the axis of the drive axle 68, with the tips of the tines tracing out a circular path 107. The strippers 100 are located between adjacent sets of four coplanar tines spaced transversely across the tooth bars 72. All but the upper leg of the strippers 100 is constructed just like the strippers 78. Specifically, as viewed from the side, each stripper 100 has an arcuate forward end 108 formed on a radius about the drive shaft 68 but instead of being semicircular the top end of the arc stops about 20° short of being a semi-circle. The stripper 100 has an upper leg including a straight first portion 110 which diverges from a straight lower leg 112 of the stripper, the rear end of the leg 112 being bolted to the frame 66, as at 86. Joined to and preceding rearwardly and then downwardly from the straight first portion 110 of the upper stripper leg is an arcuately curved second portion 114 having its rear end bolted to the frame 66, as at 116. While it need not necessarily be so, the curved second portion 114 is formed along a radius equal to that of the forward end 108 of the stripper 100. The length of the straight first portion 110 and curvature of the second portion 114 of the upper leg of the stripper are chosen such that as the tines 75 of the teeth 74 rotate by the crop inlet 58, the upper leg portions 110 and 114 of the strippers 100 act to elevate the crop off the tines 75 with the tines moving completely below the upper leg at approximately the ten o'clock position of the tines.

During initial formation of the bale 62, the upper stripper leg straight first portion 110 will direct a mat of crop carried by the tines 75 towards an area of the belt run 46 which extends above the lower front gate roll 40. Because of the upward inclination of the leg portion 108, the crop will have a substantial upward component of movement to thereby complement the movement of the belt run 46 in taking away incoming crop so as to reduce any tendency to plug. Also, it will be appreciated that once the bale 62 is formed to a size where it rests on the roll 40 the fixed-position, radial tines 75 will act to positively stuff crop into the nip between the bale 62 and the belts 42 at the area where they are engaged with the roll 42. This action is to be contrasted to that of the pickup 60' where the tines 75, in effect, are withdrawing along their longitudinal axes at the point where they are approaching the belts.

Aside from the functional improvement of the fixed tines 75, it will be appreciated that the construction is less expensive than that of the cam-controlled tines since it is not necessary to provide a cam having an endless track nor to provide a roller for following the track.

We claim:

1. In a large round baler including a baling chamber having an inlet at the bottom thereof and a transverse pickup located below said inlet and having a rotatable reel including a plurality of tooth bars located in equi-angularly spaced locations about a drive shaft, pickup teeth mounted along the each tooth bar and having tines spaced evenly therealong for elevating windrowed crop and directing it toward an upwardly moving surface of a bale forming conveyor located at a rear location of said inlet, said pickup further including a stripper assembly comprising strippers looped about the bottom, front and top of said reel and defining longitudinal slots through which the tines move during rotation of the reel, the improvement comprising: said tooth bars having their dispositions fixed relative to said drive shaft with said tines extending substantially radially relative to said drive shaft with the tips thereof each tracing out a circular path about the drive shaft; said stripper assembly having an upper surface having an upwardly and rearwardly inclined first portion and a downwardly and rearwardly extending second portion, with said first portion being directed towards said inlet and towards said upwardly moving surface of said conveyor whereby said first portion will cause the crop to have an upward component of motion as it comes into contact with said upwardly moving surface of said conveyor; and said second portion being adjacent said upwardly moving conveyor surface and being spaced sufficiently from said drive shaft that the circular tine paths pass below said second portion at a location adjacent said upwardly moving surface.

2. The large round baler defined in claim 1 wherein said stripper assembly, as viewed from the side includes a forward end formed as part of a cylinder; and said first portion of the upper surface of the stripper assembly extending tangent to said cylinder.

3. The large round baler defined in claim 2 wherein said second portion is formed as part of a second cylinder with said first portion of the upper surface of the stripper assembly extending tangent to said second cylinder.

4. The large round baler defined in claim 3 wherein said first and second cylinders are of equal size.

5. The large round baler defined in claim 1 wherein said baling chamber is defined by at least one baler belt supported on a plurality of support rolls extending between and rotatably mounted a locations spaced generally about the perimeter of opposite side walls of the baler; and said conveyor surface is, as considered when the baling chamber is empty, a forward surface of a run of said baler belt extending upwardly from one of said belt support rolls which, together with the belt defines the rear of the inlet.

6. The large round baler defined in claim 5 wherein said first portion of the stripper assembly is located in a plane which passes substantially tangent to said one of the belt support rolls.

7. The large round baler defined in claim 6 wherein said second portion of the stripper assembly, as viewed from the side, is formed in the shape of a portion of a cylinder and is approximately tangent to the belt run a location thereof wrapped on said one of the support rolls whereby a space is provided between said one of the support rolls and said second portion of the stripper assembly for receiving incoming crop prior to the latter entering a nip formed between the belt run and a rotating, partially formed bale supported at least in part by said one of the support rolls.

8. The large round baler defined in claim 7 wherein a forward end of the stripper assembly, as viewed from the side is in the form of a portion of a second cylinder having the same radius as the cylindrical portion of the second portion of the stripper assembly, and said first portion of the stripper assembly being tangent to both the forward end and the second portion of the stripper assembly.

* * * * *